(12) United States Patent
Farrand et al.

(10) Patent No.: US 8,743,451 B2
(45) Date of Patent: *Jun. 3, 2014

(54) COLOURED PARTICLES FOR ELECTROPHORETIC DISPLAYS

(75) Inventors: Louise Diane Farrand, Blandford Forum (GB); Mark John Goulding, Ringwood (GB); Jonathan Henry Wilson, Southampton (GB); Ashley Nathan Smith, Southampton (GB); Mark James, Romsey (GB); Daniel Walker, Darmstadt (GB)

(73) Assignee: Merck Patent GmbH, Darmstadt (DE)

( * ) Notice: Subject to any disclaimer, the term of this patent is extended or adjusted under 35 U.S.C. 154(b) by 60 days.

This patent is subject to a terminal disclaimer.

(21) Appl. No.: 13/148,387

(22) PCT Filed: Jan. 29, 2010

(86) PCT No.: PCT/EP2010/000551
§ 371 (c)(1), (2), (4) Date: Aug. 8, 2011

(87) PCT Pub. No.: WO2010/089059
PCT Pub. Date: Aug. 12, 2010

(65) Prior Publication Data
US 2011/0297888 A1 Dec. 8, 2011

(30) Foreign Application Priority Data
Feb. 9, 2009 (EP) .................................. 09001775

(51) Int. Cl.
*G02B 26/00* (2006.01)

(52) U.S. Cl.
USPC ........................................ 359/296; 204/600

(58) Field of Classification Search
USPC .............. 359/296; 430/32; 345/107; 204/600
See application file for complete search history.

(56) References Cited

U.S. PATENT DOCUMENTS

| | | | |
|---|---|---|---|
| 4,613,559 A | 9/1986 | Ober et al. | |
| 5,380,362 A | 1/1995 | Schubert | |
| 5,403,518 A | 4/1995 | Schubert | |
| 5,521,271 A * | 5/1996 | Smith et al. | 526/265 |
| 5,607,864 A | 3/1997 | Ricchiero et al. | |
| 5,663,024 A * | 9/1997 | Smith et al. | 430/97 |
| 5,716,855 A | 2/1998 | Lerner et al. | |
| 5,783,614 A | 7/1998 | Chen et al. | |
| 6,194,488 B1 | 2/2001 | Chen et al. | |
| 6,822,782 B2 | 11/2004 | Honeyman et al. | |
| 6,956,690 B2 | 10/2005 | Yu et al. | |
| 7,038,655 B2 | 5/2006 | Herb et al. | |
| 7,052,766 B2 | 5/2006 | Zang et al. | |
| 7,100,162 B2 | 8/2006 | Green et al. | |
| 7,170,670 B2 | 1/2007 | Webber | |
| 7,226,550 B2 | 6/2007 | Hou et al. | |
| 7,236,290 B1 | 6/2007 | Zhang et al. | |
| 7,247,379 B2 | 7/2007 | Pullen et al. | |
| 7,277,218 B2 | 10/2007 | Hwang et al. | |
| 7,304,634 B2 | 12/2007 | Albert et al. | |
| 2003/0203817 A1 | 10/2003 | Katoh et al. | |
| 2005/0267263 A1 | 12/2005 | Minami | |
| 2007/0128352 A1 | 6/2007 | Honeyman et al. | |
| 2007/0200795 A1* | 8/2007 | Whitesides et al. | 345/55 |
| 2007/0268244 A1 | 11/2007 | Chopra et al. | |
| 2007/0297038 A1 | 12/2007 | Chopra et al. | |
| 2008/0013156 A1 | 1/2008 | Whitesides et al. | |

FOREIGN PATENT DOCUMENTS

| | | | |
|---|---|---|---|
| EP | 1 491 941 | 12/2004 | |
| GB | 2 438 436 | 11/2007 | |
| JP | S5918711 | 1/1984 | |
| WO | WO-99 10767 | 3/1999 | |
| WO | WO-2005 017046 | 2/2005 | |
| WO | WO-2006 126120 | 11/2006 | |
| WO | WO-2007 048721 | 5/2007 | |
| WO | WO-2008 003604 | 1/2008 | |
| WO | WO-2008 003619 | 1/2008 | |
| WO | WO2009/100803 A2 * | 8/2009 | C08F 2/22 |

OTHER PUBLICATIONS

Ego, C. et al., "Attaching perylene dyes to polyfluorene: Three simple, efficient methods for facile color tuning of light-emitting polymers," J. Am. Chem. Soc., 2003, vol. 125, pp. 437-443.
International Search Report for PCT/EP2010/000551 dated Jun. 22, 2010.
Kim, T. H. et al., "Preparation and Characterization of Colored Electronic Ink Nanoparticles by High Temperature-Assisted Dyeing for Electrophoretic Displays," Journal of Nanoscience and Nanotechnology, 2006, vol. 6, pp. 3450-3454.
Tse, A. S. et al., "Synthesis of Dyed Monodisperse Poly(methyl methacrylate) Colloids for the Preparation of Submicron Periodic Light-Absorbing Arrays," Macromolecules, 1995, vol. 28, pp. 6533-6538.
English Abstract of Japanese Patent/Publication JP 59018711A. "Colored Polymer Latex". Inventor: Yoshimoto Shinji et al. Publication Date: Jan. 31, 1984. JP Application No: JP1982128240A. Filing Date: Jul. 21, 1982. (3 pages) (Thomasson Innovation).
Bibliographic Data and English Abstract of Japanese Patent/Publication JP 559018711A. "Colored Polymer Latex". Inventor: Yoshimoto Shinji et al. Publication Date: Jan. 31, 1984. JP Application No: JP1982128240A. Filing Date: Jul. 21, 1982. (2 pages).

* cited by examiner

*Primary Examiner* — Scott J Sugarman
*Assistant Examiner* — Vipin Patel
(74) *Attorney, Agent, or Firm* — Millen, White, Zelano & Branigan, P.C.

(57) ABSTRACT

This invention relates to colored polymer particles preferably with surface functionality for charge retention, a process for their preparation, the use of these particles for the preparation of an electrophoretic device, and to color electrophoretic displays comprising such particles.

15 Claims, No Drawings

COLOURED PARTICLES FOR ELECTROPHORETIC DISPLAYS

This invention relates to colored polymer particles, preferably with surface functionality for charge retention, a process for their preparation, the use of these particles for the preparation of an electrophoretic device, and to color electrophoretic displays comprising such particles.

In recent years a need has developed for low power, low cost and light weight display devices. EPDs (Electrophoretic Displays) can fulfil this requirement. One use of EPDs is for electronic paper. It is imperative that once an image is displayed, the image can be retained for a long period of time without further voltage being applied. Hence, this fulfils the requirements of low power use, and means an image can be visible until another image is required.

An EPD generally comprises charged electrophoretic particles dispersed between two substrates, each comprising one or more electrodes. The space between the electrodes is filled with a dispersion medium which is a different color to the color of the particles. If a voltage is applied between the electrodes, charged particles move to the electrode of opposite polarity. The particles can cover the observer's side electrode, so that a color identical to the color of the particles is displayed when an image is observed from the observer's side. Any image can be observed using a multiplicity of pixels.

Available technologies of EPDs include electronic paper, commercially used in electronic books. This application uses black and white or light color. However, the main disadvantage of state of the art EPDs is the lack of a bright full color system.

The use of different colored particles in a single pixel has been exemplified in recent patent literature (U.S. Pat. No. 7,304,634, GB 2 438 436, US 2007/0268244), but all of these approaches require the use of complex cell structures and drive schemes.

Special colored particles for EPDs and processes for their preparation are disclosed in US 2007/0297038, US 2008/0013156, U.S. Pat. No. 6,822,782, WO 2007/048721, WO 2008/003619, WO 2008/003604, US 2005/0267263, WO 2006/126120, and J. Nanosci. Nanotechn. 2006, Vol. 6, No. 11, p. 3450-3454. Two particle system comprising inorganic and resin particles are also known (EP 1 491 941). These colored particles are only achievable by complicated processes and/or they are only suitable for specific applications. Similar colored particles and their preparation processes are known for analytical techniques (U.S. Pat. No. 5,607,864 and U.S. Pat. No. 5,716,855) and as toner particles for ink jet printing (U.S. Pat. No. 4,613,559).

There is a need for a simple preparation of charged colored particles which can be easily dispersed in non-polar media, show electrophoretic mobility and which do not leach color in a dispersant.

Therefore, the object of this invention is to provide electro-optically active media for color electrophoretic displays and specifically engineered colored particles for use in such media.

This object is solved by a process for the preparation of colored polymer particles for use in electrophoretic devices comprising the steps of a) preparing polymer particles, preferably comprising sites of charging and/or of stabilisation, b) coloring the polymer particles by addition of at least one polymerisable dye, c) polymerising the polymerisable dye and preferably d) washing and drying the colored polymer particles, by these particles per se, by the use of these particles for the preparation of an electrophoretic device, and by color electrophoretic displays comprising such particles.

The subject matter of this invention relates specifically to the use of specifically engineered polymer particles and their dispersion in dielectric organic media to produce a composition preferably suitable as the electrically switchable component of a full color e-paper or electrophoretic display.

It relates more specifically to the synthesis of polymer particles, their surface modification with covalently bonded substituents to promote dispersability and the holding of a charge and to the physical and irreversible entrapment of a polymerisable dye to give color to the particles.

It also relates specifically to dispersions of the afore-mentioned polymer particles in dielectric organic media, which enable electrophoretic switching of the particles in an applied electric field.

Advantages of the polymer particles according to the invention may be, in particular:
- excellent control of particle size, monodisperse size distribution with a small diameter range of 50-500 nm, preferably 150-400 nm, for image quality, and/or
- a glassy polymer nature for optical clarity and color compatibility, and/or
- a homogeneous crosslinked network structure for solvent resistance, and/or
- a non-swelling nature when dispersed in EPD solvent media, impact strength, hardness, and/or
- dispersible in a non polar continuous phase that is the most used media for EPD, and/or
- high electrophoretic mobility in dielectric media, and/or
- technique is universally applicable for dye incorporation across all colors, and/or
- accurate zeta potential is possible, and/or
- all colors have same density (good for sedimentation/agglomeration performance), and/or
- excellent switching behaviour, faster response times at comparable voltages, and/or
- consistent surface properties, and/or
- good reproducibility, and/or
- densities close to that of the carrier fluid.

The main advantages of the present invention are that it is possible to prepare particles of appropriate colors e.g. red, green and blue or a combination of cyan, magenta and yellow, and to be able to prepare colored particles of a desired size and which have a high mono-dispersity, and which preferably incorporate a charge, to enable electrophoretic movement.

The present invention provides an easy way for the production of colored polymeric particles, wherein charge and color can be controlled independently from each other. It is especially advantageous that the inventive particles do not leach any color into a non-polar solvent used a carrier fluid in EPD even over a long time period.

In design and synthesis of particles for EPD, the present invention provides the opportunity to manipulate color, charge, size, mono-dispersity etc. independently in order to produce particles with all the desired features for colored EPD.

Coloured polymer particles of the invention comprise as essential components a polymeric framework and at least one polymerised dye. Preferably the colored polymer particles consist only of a polymeric framework and at least one polymerised dye. The polymerised dye is advantageously formed by polymerisation of a polymerisable dye after coloration of polymer particles with that polymerisable dye.

An essential component of the present invention is a polymerisable dye. In general the polymerisable dyes may be solvent soluble or water soluble and they may be anionic, cationic or neutral.

The function of the polymerisable dye is to color the particle. The polymerisable dye consists of a chromophore, one or more polymerisable groups, optional linker groups (spacers), and optional groups to modify physical properties (like solubility, light fastness, etc.) and optionally charged group(s).

The polymerisable dye preferably comprises a chromophoric group and a functional group or plurality of functional groups selected from polymerisable groups e.g. methacrylates, acrylates, methacrylamides, acrylonitriles, substituted acrylates, styrenes and vinyl ethers, vinyl esters, propenyl ethers, oxetanes and epoxys etc., in particular methacrylates and acrylates.

The polymerisable group may be attached directly to the chromophoric group or may be attached through a linker group. An example of a suitable linker group is an optionally substituted alkyl chain, a polyether alkyl chain, a cycloalkyl or aromatic ring, heteroaromatic ring or a combination thereof.

The chromophoric group preferably comprises of conjugated aromatic (including heteroaromatic) and/or multiple bonds including: azo (including monoazo, bisazo, trisazo, linked azos etc), metallised azo, anthraquinone, pyrroline, phthalocyanine, polymethine; aryl-carbonium, triphendioxazine, diarylmethane, triarylmethane, anthraquinone, phthalocyanine, methine, polymethine, indoaniline, indophenol, stilbene, squarilium, aminoketone, xanthene, fluorone, acridene, quinolene, thiazole, azine, induline, nigrosine, oxazine, thiazine, indigoid, quinonioid, quinacridone, lactone, benzodifuranone, flavonol, chalone, polyene, chroman, nitro, naphtholactam, formazene or indolene group or a combination of two or more such groups.

Preferred chromophoric groups are azo groups (especially monoazo, and bisazo), anthraquinone and phthalocyanine groups.

Preferably the polymerisable dye comprises a chromophoric group and one or more functional groups selected from an acrylate or methacrylate backbone.

A polymerisable dye may contain a single chromophore, for example with bright yellow, magenta or cyan colors and self shade blacks. However, it may also contain mixed covalently attached chromophores for example to obtain a black color, by covalently attached brown and blue or yellow, magenta and cyan. Green can be obtained by yellow and cyan etc. Extended conjugated chromophores can also be used to obtain some shades. For example, bis- and trisazo compounds can be used to obtain blacks and other duller shades (navy blue, brown, olive green, etc).

Mixtures of polymerisable dyes can also be used to obtain the correct particle shade; for example a black from single component mixtures of brown and blue or yellow, magenta and cyan pre-polymerised dyes. Similarly shades can be tuned for example by adding small quantities of separate polymerisable dyes to modify the color of the particles (e.g. 95% yellow and 5% cyan to get a greener yellow shade).

Modified polymerisable dyes (with reactive group(s) from the application groups of reactive (anionic), direct (anionic), acidic (anionic) and basic (cationic) dyes as designated by the Colour Index (published by The Society of Dyers and Colourists with the American Association of Textile Chemists and Colorists e.g. $3^{rd}$ edition 1982) are preferred.

The polymerisable dye may be homo-polymerised. But it is also possible to co-polymerise it with additional monomers. Preferable examples of polymerisable dyes, optionally in combination with co-monomers, are summarised in the following Tables, wherein Me is methyl, Et is ethyl, and n is 1-20.

| Examples of Solvent Soluble Reactive Dyes, Dye Examples 1-8 are commercially available from Sigma-Aldrich chemical company | |
|---|---|
| 1 Disperse red 1 acrylate | 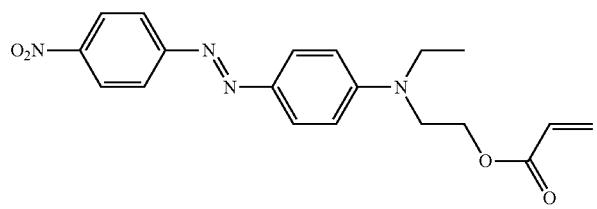 [SMILES: C=CC(=O)OCCN(CC)c1ccc(/N=N/c2ccc([N+](=O)[O-])cc2)cc1] |
| 2 Disperse Red 1 methacrylate | 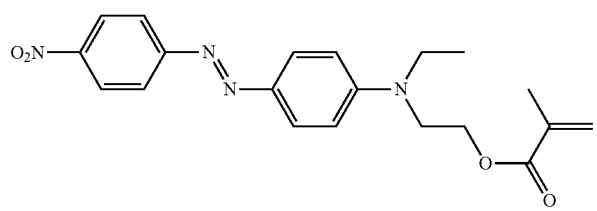 [SMILES: C=C(C)C(=O)OCCN(CC)c1ccc(/N=N/c2ccc([N+](=O)[O-])cc2)cc1] |
| 3 Disperse Red 13 acrylate | 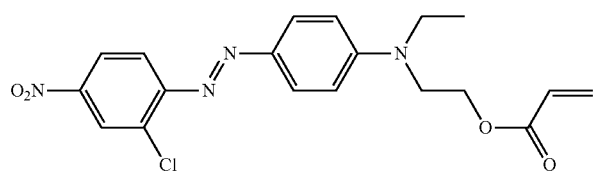 [SMILES: C=CC(=O)OCCN(CC)c1ccc(/N=N/c2ccc([N+](=O)[O-])cc2Cl)cc1] |

-continued

Examples of Solvent Soluble Reactive Dyes, Dye Examples 1-8 are commercially available from Sigma-Aldrich chemical company

| 4 | Disperse Red 13 methacrylate | 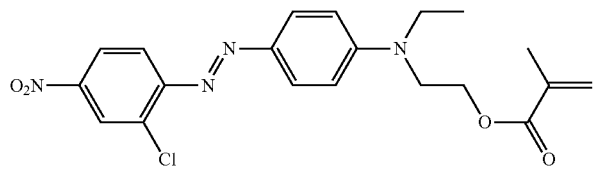 [SMILES: C=C(C)C(=O)OCCN(CC)c1ccc(/N=N/c2ccc([N+](=O)[O-])cc2Cl)cc1] |
| 5 | Disperse Yellow 7 methacrylate | 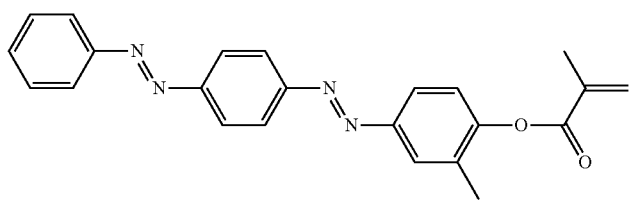 [SMILES: C=C(C)C(=O)Oc1ccc(/N=N/c2ccc(/N=N/c3ccccc3)cc2)cc1C] |
| 6 | Disperse Yellow 7 acrylate | 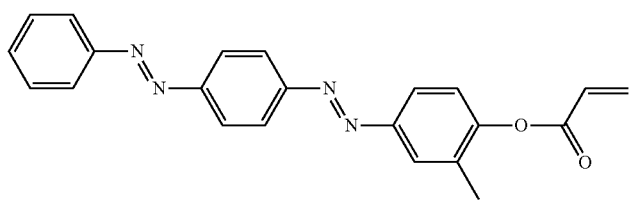 [SMILES: C=CC(=O)Oc1ccc(/N=N/c2ccc(/N=N/c3ccccc3)cc2)cc1C] |
| 7 | Disperse Orange 3 acrylamide | 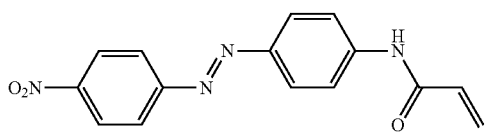 [SMILES: C=CC(=O)Nc1ccc(/N=N/c2ccc([N+](=O)[O-])cc2)cc1] |
| 8 | Disperse Orange 3 methacrylamide | 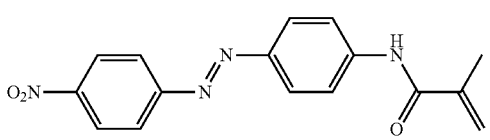 [SMILES: C=C(C)C(=O)Nc1ccc(/N=N/c2ccc([N+](=O)[O-])cc2)cc1] |
| 9 | Disperse red 1 methacrylate and methyl methacrylate | 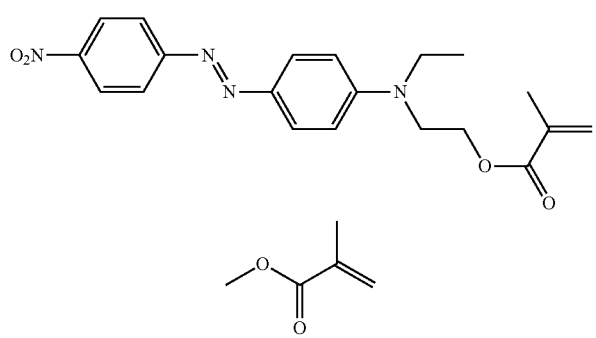 |
| 10 | Disperse red 1 acrylate and methyl methacrylate | 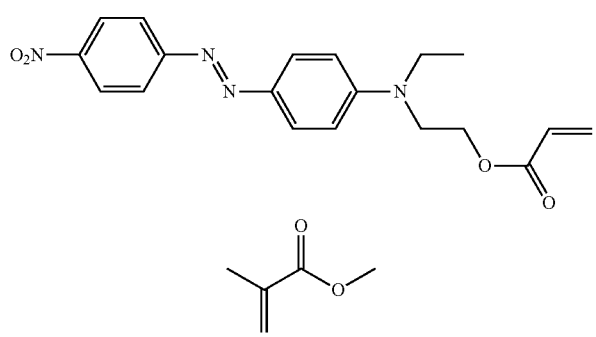 |

-continued

Examples of Solvent Soluble Reactive Dyes, Dye Examples 1- 8 are commercially available from Sigma-Aldrich chemical company

| | | |
|---|---|---|
| 11 | Disperse red 1 acrylate and methyl methacrylate and ethylene glycol dimethacrylate | 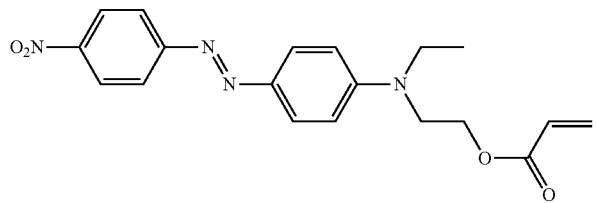 [SMILES: C=CC(=O)OCCN(CC)c1ccc(/N=N/c2ccc([N+](=O)[O-])cc2)cc1]<br>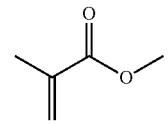<br>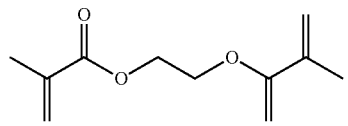 |
| 12 | Disperse Yellow 3 methacrylate and methyl methacrylate | 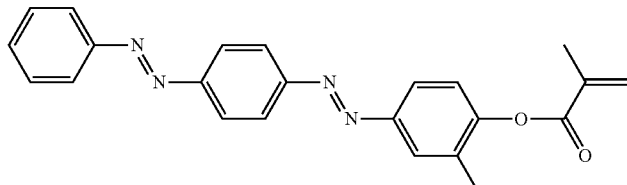<br>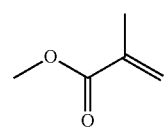 |
| 13 | Disperse Yellow 3 acrylate and methyl methacrylate | 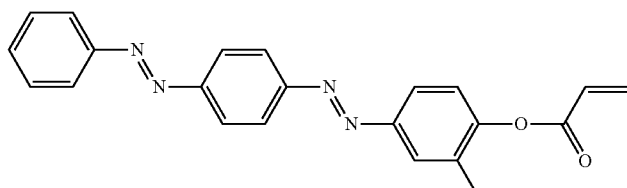<br>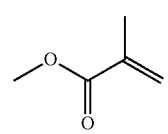 |
| 14 | Disperse Yellow 3 acrylate and ethylene glycol dimethyl methacrylate | 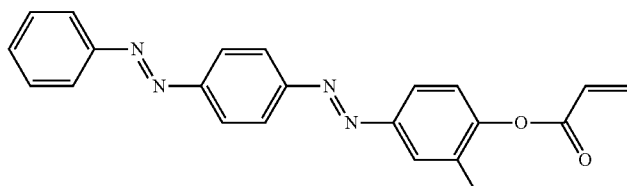<br>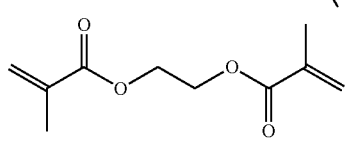 |

-continued
Examples of Solvent Soluble Reactive Dyes, Dye Examples 1- 8 are commercially available from Sigma-Aldrich chemical company
15 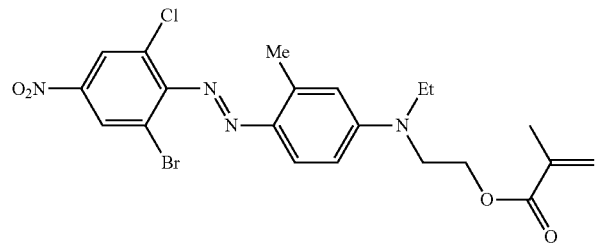 [SMILES: C=C(C)C(=O)OCCN(CC)c1ccc(/N=N/c2c(Cl)cc([N+](=O)[O-])cc2Br)c(C)c1]
16 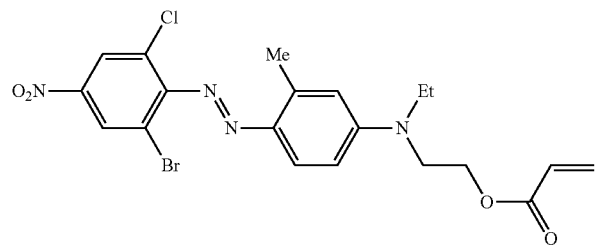 [SMILES: C=CC(=O)OCCN(CC)c1ccc(/N=N/c2c(Cl)cc([N+](=O)[O-])cc2Br)c(C)c1]
17 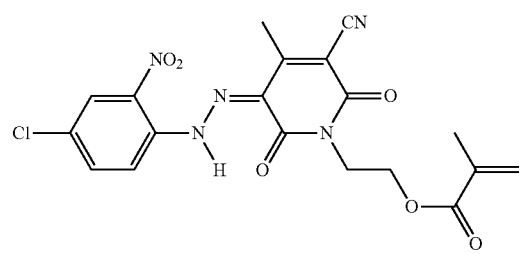 [SMILES: C=C(C)C(=O)OCCN1C(=O)C(C#N)=C(C)/C(=N/Nc2ccc(Cl)cc2[N+](=O)[O-])C1=O]
18 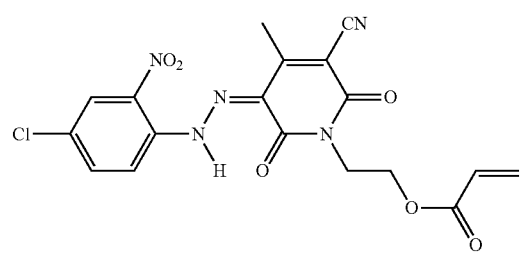 [SMILES: C=CC(=O)OCCN1C(=O)C(C#N)=C(C)/C(=N/Nc2ccc(Cl)cc2[N+](=O)[O-])C1=O]
19 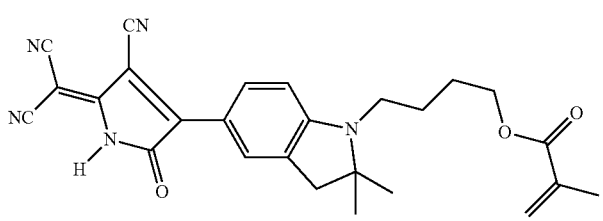 [SMILES: C=C(C)C(=O)OCCCCN1c2ccc(C3=C(C#N)C(=C(C#N)C#N)NC3=O)cc2CC1(C)C]
20 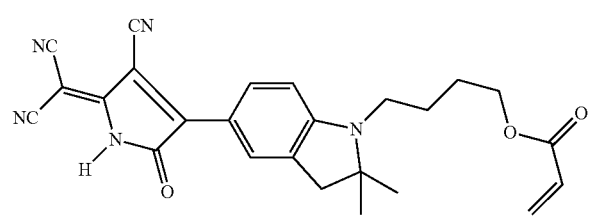 [SMILES: C=CC(=O)OCCCCN1c2ccc(C3=C(C#N)C(=C(C#N)C#N)NC3=O)cc2CC1(C)C]

-continued
Examples of Solvent Soluble Reactive Dyes, Dye Examples 1- 8 are commercially available
from Sigma-Aldrich chemical company
21
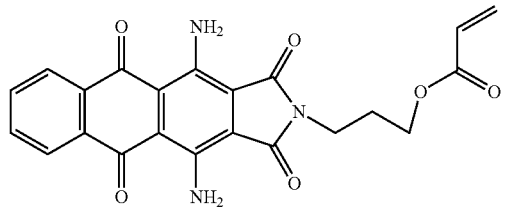
22
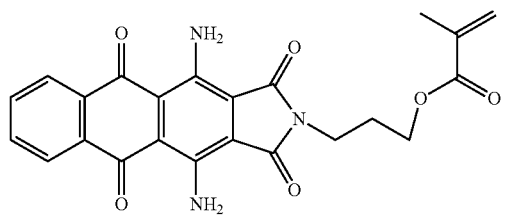 [SMILES: C=C(C)C(=O)OCCCn1c(=O)c2c(N)c3c(=O)c4ccccc4c(=O)c3c(N)c2c1=O]
23
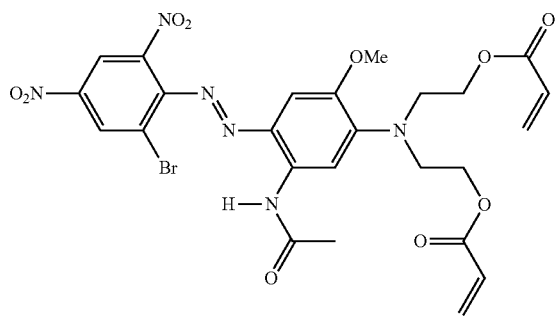 [SMILES: C=CC(=O)OCCN(CCOC(=O)C=C)c1cc(NC(C)=O)c(/N=N/c2c(Br)cc([N+](=O)[O-])cc2[N+](=O)[O-])cc1OC]
24
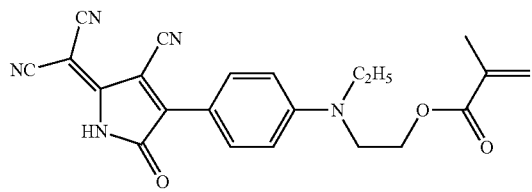 [SMILES: C=C(C)C(=O)OCCN(CC)c1ccc(C2=C(C#N)C(=C(C#N)C#N)NC2=O)cc1]
25
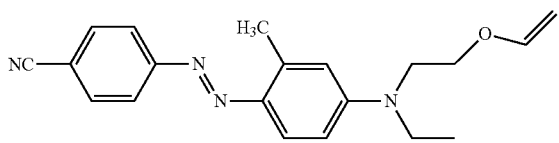 [SMILES: C=COCCN(CC)c1ccc(/N=N/c2ccc(C#N)cc2)c(C)c1]
26
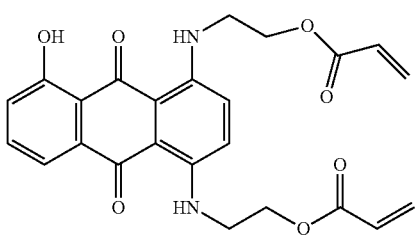 [SMILES: C=CC(=O)OCCNc1ccc(NCCOC(=O)C=C)c2c1C(=O)c1cccc(O)c1C2=O]

-continued

Examples of Solvent Soluble Reactive Dyes, Dye Examples 1- 8 are commercially available from Sigma-Aldrich chemical company 27 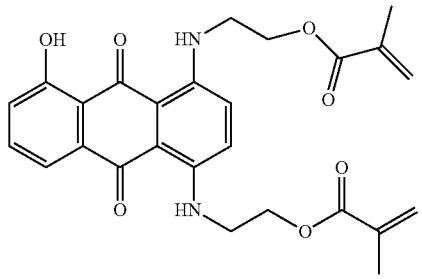 [SMILES: C=C(C)C(=O)OCCNc1ccc(NCCOC(=O)C(=C)C)c2c1C(=O)c1cccc(O)c1C2=O]

28 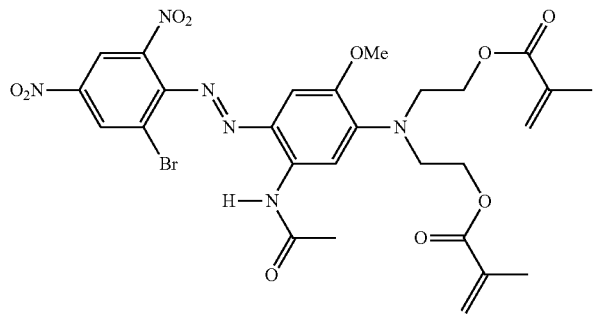 [SMILES: C=C(C)C(=O)OCCN(CCOC(=O)C(=C)C)c1cc(NC(C)=O)c(/N=N/c2c(Br)cc([N+](=O)[O-])cc2[N+](=O)[O-])cc1OC]

29 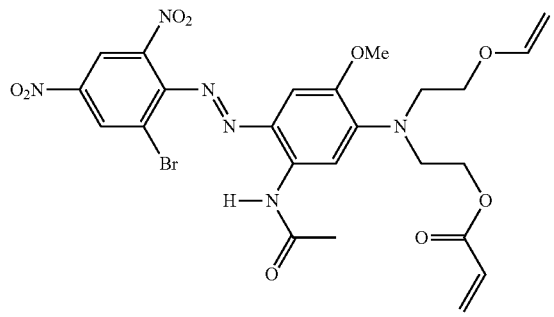 [SMILES: C=COCCN(CCOC(=O)C=C)c1cc(NC(C)=O)c(/N=N/c2c(Br)cc([N+](=O)[O-])cc2[N+](=O)[O-])cc1OC]

Cationic polymerisable dyes contain a covalently attached group or groups which have a positive charge in the application or contain a positive charge in the chromophore group. They can be derived from protonation or quaternation of nitrogen, phosphorous, oxygen or sulphur atoms or groups containing them, for example heteroaromatic (thiazole, imidazole) delocalised nitrogen bases (guanidine etc). Associated anions preferably have a single charge and can be halogen ($F^-$, $Cl^-$, $Br^-$ etc), monobasic acid (oxo) anions (acetate, propionate, lactate, methane sulphonate, p-toluenesulphonate, hydroxide, nitrate, etc).

Preferred examples of water soluble cationic polymerisable dyes are listed in Table 2 (counter ion $MeOSO_3^-$, also preferably suitable are Br, and acetate)

TABLE 2

1 Basic blue 41 methacrylate

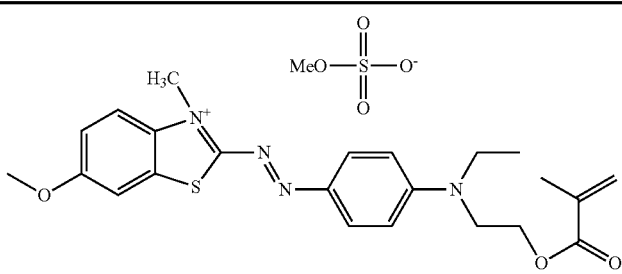

TABLE 2-continued
2 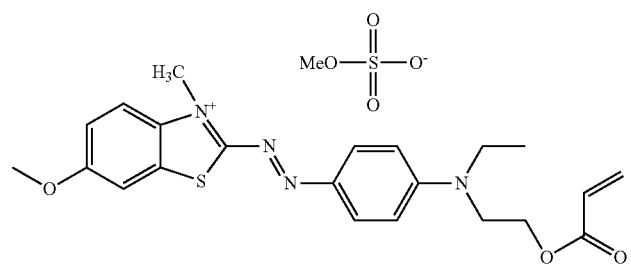 [SMILES: C=CC(=O)OCCN(CC)c1ccc(/N=N/c2sc3cc(OC)ccc3[n+]2C)cc1 ; COS(=O)(=O)[O-]]
3 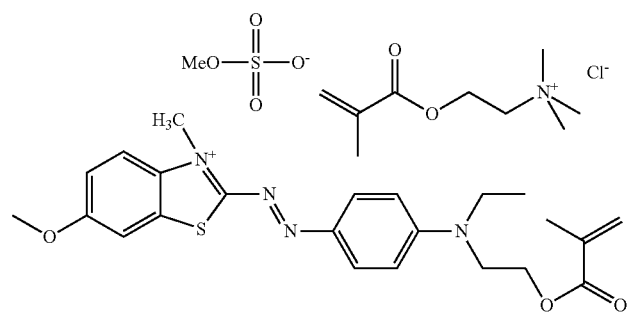 [SMILES: C=C(C)C(=O)OCCN(CC)c1ccc(/N=N/c2sc3cc(OC)ccc3[n+]2C)cc1 ; COS(=O)(=O)[O-] ; C=C(C)C(=O)OCC[N+](C)(C)C ; [Cl-]]
4 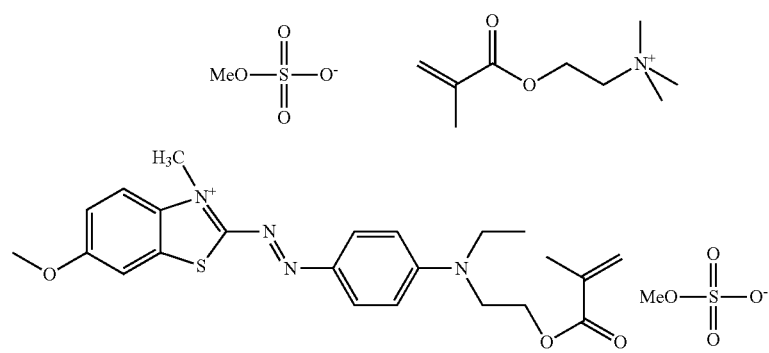 [SMILES: COS(=O)(=O)[O-] ; C=C(C)C(=O)OCC[N+](C)(C)C ; C=C(C)C(=O)OCCN(CC)c1ccc(/N=N/c2sc3cc(OC)ccc3[n+]2C)cc1 ; COS(=O)(=O)[O-]]
5 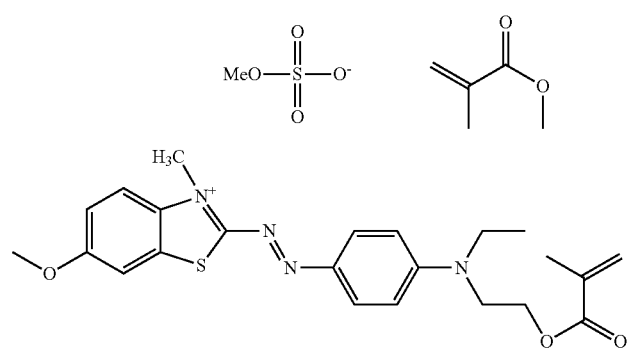
6 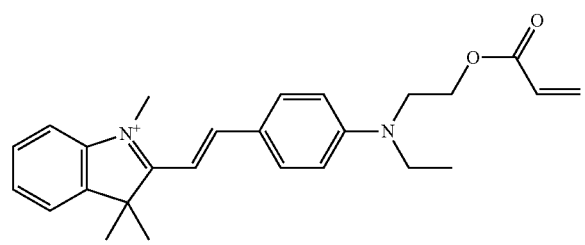 [SMILES: C=CC(=O)OCCN(CC)c1ccc(/C=C/C2=[N+](C)c3ccccc3C2(C)C)cc1]

TABLE 2-continued

7
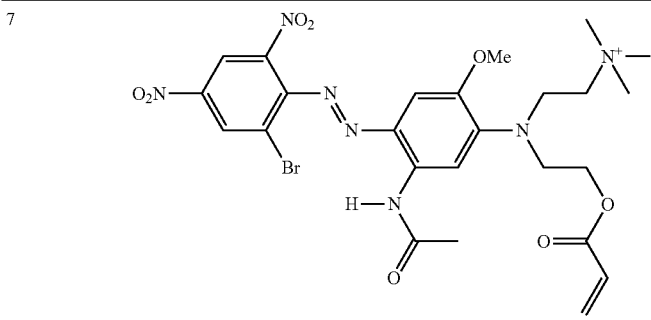

Anionic polymerisable dyes contain a covalently attached group or groups which have a negative charge in the application and can be derived from deprotonation of an acidic group for example sulphonic, carboxylic, phosphonic acids. Associated cations preferably have a single charge and can be metallic ($Li^+$, $Na^+$, $K^+$, etc), charged nitrogen ($NH_4^+$, $NEt_3H^+$, $NEt_4^+$, $NMe_4^+$, imidazolium cation etc), positively charged phosphorous, sulphur etc. Preferred examples of water soluble anionic dyes are the $Na^+$, $NH_4^+$, $NEt_4^+$ salts of the acids.

Another preferred example is $CuPc(SO_3—)_n$ $(SO_2NHCH_2CH_2COOCMe=CH_2)_m$ where CuPc is copper phthalocyanine and m>1, n>1, m+n>2 and <16 and preferably in the range of 2-5.

Preferred dye acids are listed in Table 3. Preferred water dispersible neutral dyes are listed in Table 4.

TABLE 3

1
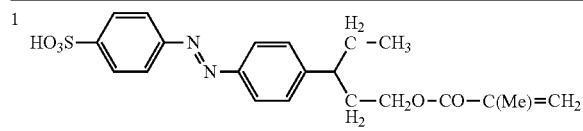

2
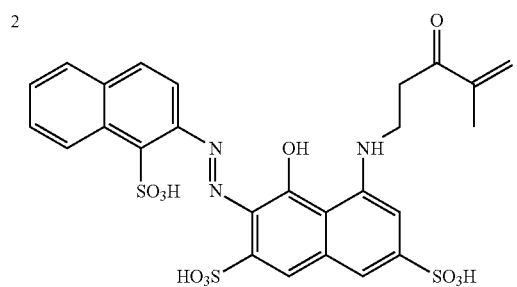

3

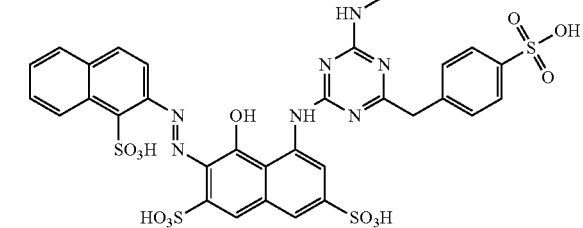

TABLE 4

1
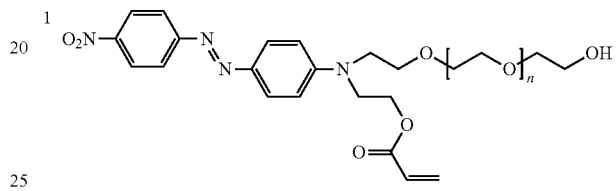

2
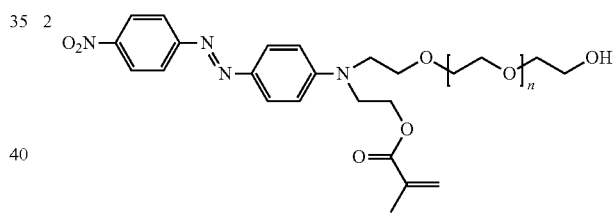

The polymerisable dyes may be homo-polymerised or co-polymerised with additional monomers. The monomers described in the following for preparation of the polymeric particles can also be combined with the polymerisable dyes to produce a polymerisable dye-monomer mixture to be added to and/or incorporated in to the particles. Addition of a co-monomer seems advantageous in that it increases the amount of reactive groups available for polymerisation, the polymerisation proceeds faster with additional monomer. Particularly preferable are monomers which are similar to the particle make up, such as disperse red 1 acrylate with methyl methacrylate.

Additionally, using this system it is possible to co-polymerise polymerisable dyes with charged monomers such as 2-methacryloxy ethyl trimethyl ammonium chloride (MOTAC) at the particle.

Additionally, using this system it is possible to co-polymerise mixtures of dyes at the particle Preferred combinations of solvent soluble dyes with charged monomer are listed in Table 5.

TABLE 5

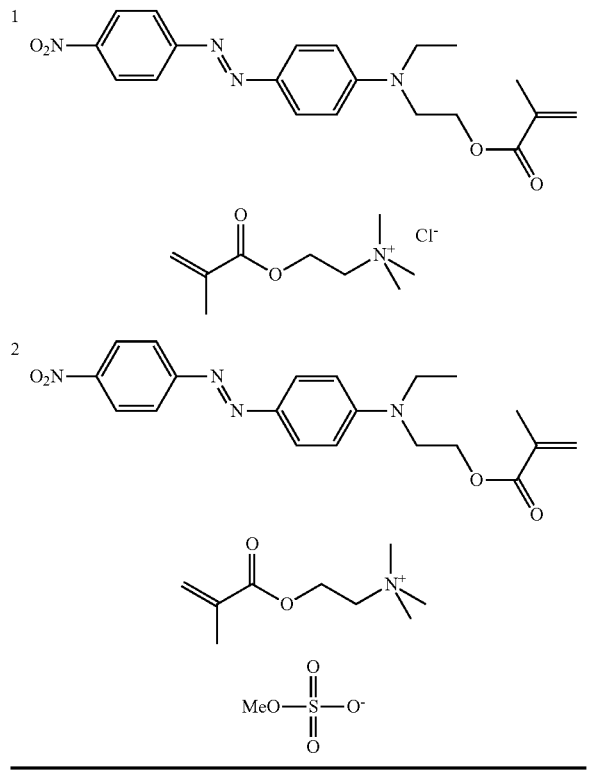

Preferred water-soluble polymerisable dyes are such as the acrylate or methacrylate derivatives of cationic Basic Blue 41 (listed in Table 2 as numbers 1 and 2) and similar dyes according to Formula 1.

Formula 1

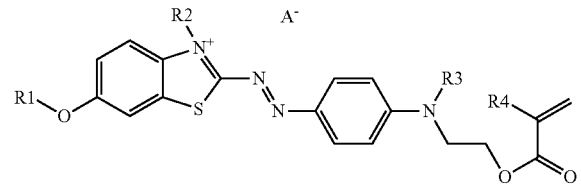

wherein R1,R2,R3=alkyl preferably C1-C4 alkyl

R4=H or CH3

A⁻=halogen, monobasic acid (oxo) anions, preferably acetate, propionate, lactate, methane sulphonate, p-toluene-sulphonate, hydroxide, or nitrate, preferably with R1,R2, R4=CH$_3$, R3=C$_2$H$_5$ and A⁻=methane sulfonate.

The preparation of such polymerisable dyes is exemplified for the methacrylate derivative of cationic Basic Blue 41 which can be prepared by a 3-step reaction as shown in the following scheme:

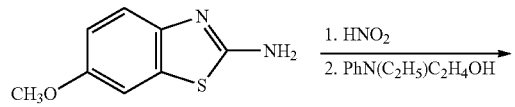

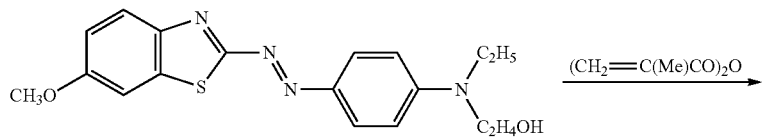

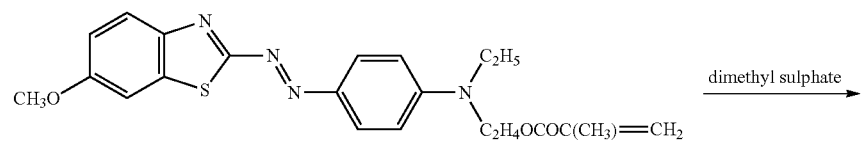

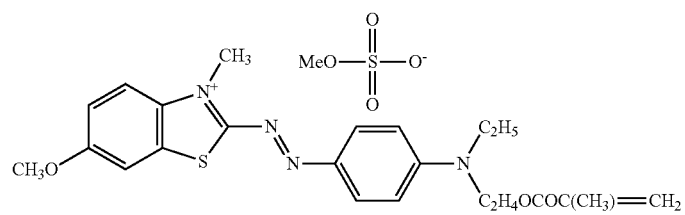

Preferred solvent soluble polymerisable dyes are for example such as commercially available Disperse Red 1 methacrylate and dyes having a structure like dyes 17 or 18 of Table 1 as shown in Formula 2.

Formula 2

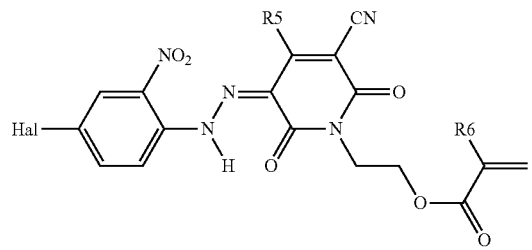

wherein R5=alkyl, preferably C1-C4 alkyl, especially $CH_3$,
R6=H or CH3, preferably $CH_3$,
Hal=halogen, preferably Cl.

The preparation of such polymerisable dyes is exemplified for the methacrylate derivative (dye 17 of Table 1) which can be prepared by a 3-step reaction as shown in the following scheme:

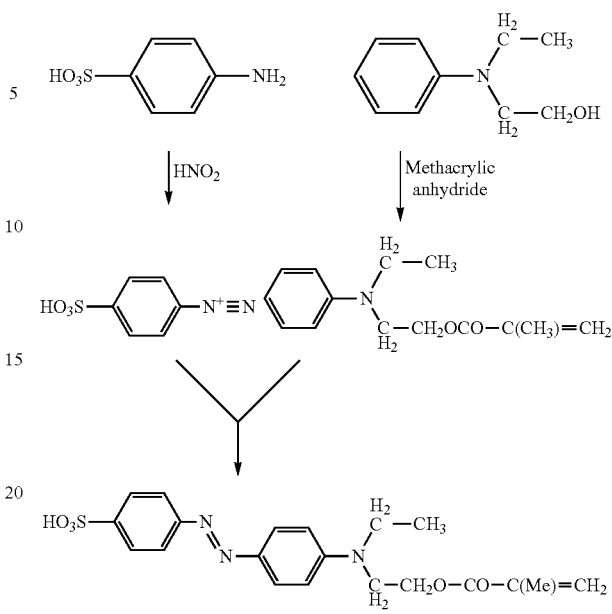

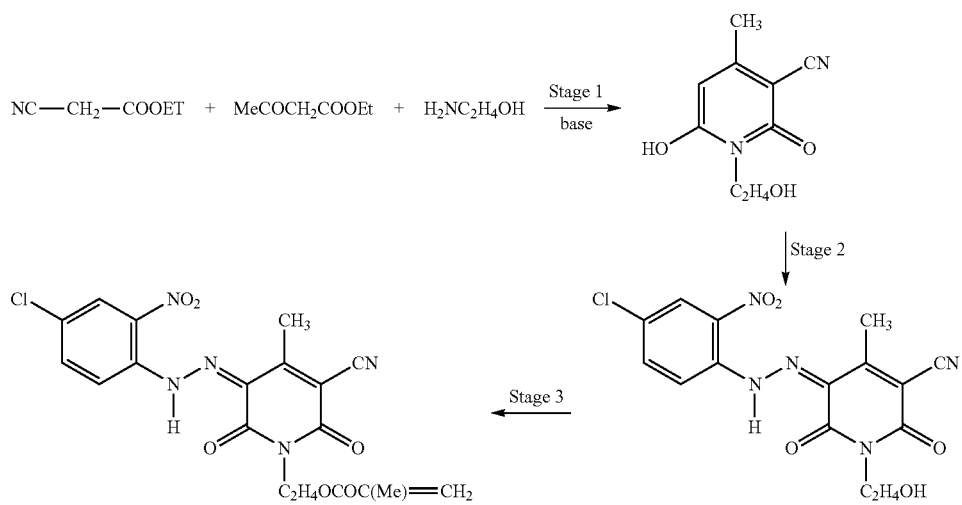

It is also possible to polymerise dyes having a structure like dye 1 of Table 3 as shown in Formula 3.

Formula 3

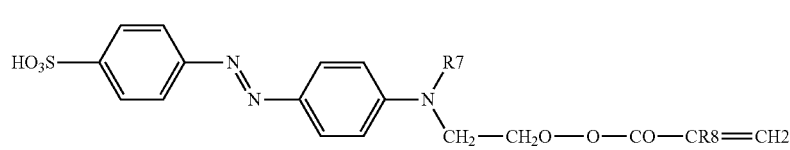

wherein R7=alkyl, preferably C1-C4 alkyl, especially $CH_3$,
R8=H or CH3, preferably $CH_3$.

The preparation of such polymerisable dyes is exemplified for the methacrylate derivative (dye 1 of Table 3) which can be prepared by a 3-step reaction as shown in the following scheme:

Preferably acrylate or methacrylate derivatives of Disperse red 1, acrylate or methacrylate derivatives of Disperse yellow 7, dyes of Formula 1, especially acrylate or methacrylate derivatives of cationic Basic Blue 41, dyes of Formula 2 and dyes of Formula 3 are used as polymerisable dyes for the invention. Especially preferred are acrylate or methacrylate derivatives of Disperse red 1, acrylate or methacrylate derivatives of cationic Basic Blue 41, and acrylate or methacrylate derivatives of Disperse yellow 7. It is further preferred to copolymerise these dyes with methyl methacrylate or methyl acrylate.

Preferably solvent soluble dyes are used in the invention.

Preferably an oil-soluble thermal initiator is added in step c) of the present process. Examples are 2,2'-Azobis(4-methoxy-2,4-dimethyl valeronitrile), 2,2'-Azobis(N-butyl-2-methylpropionamide), 2,2'-Azobis(2,4-dimethyl valeronitrile), Dimethyl 2,2'-azobis(2-methylpropionate), 2,2'-Azobis(2-methylbutyronitrile), also known as Vazo 67 (DuPont), 1,1'-Azobis(cyclohexane-1-carbonitrile), 2,2'-Azobis[N-(2-propenyl)-2-methylpropionamide], 1-[(1-cyano-1-methylethyl)azo]formamide, 2,2'-Azobis(N-cyclohexyl-2-methylpropionamide) (all available from Wako); Vazo 52 and Vazo 64 (available from DuPont), Luperox 331.

Preferably 2,2'-Azobis(2,4-dimethyl valeronitrile), Dimethyl 2,2'-azobis(2-methylpropionate), 2,2'-Azobis(2-methylbutyronitrile) or Vazo 67 are used.

Preferably a surfactant is added. Examples are Igepal CA-210, Igepal CA-520, Igepal CA-720, Igepal CO-210, Igepal CO-520, Igepal CO-630, Igepal CO-720, Igepal CO-890, Igepal DM-970, Igepal is a trademark of the GAF Corporation and these surfactants are obtained from Sigma-Aldrich. Preferably Igepal CA-720 is used.

Coloured particles suitable for use in EPD can be produced in a simple 2-step reaction.

The basic steps to provide the colored particles according to the present invention are:
preparing colorless polymer particles, preferably by emulsion polymerisation,
functionalising the surface of the particles to provide sites of charging and optionally of stabilisation,
coloring the polymer particles by polymerisation of an added polymerisable dye which subsequently does not leach into typical EPD fluids, and
preferably washing and drying the colored polymer particles.

Functionalising the surface of the particles to provide sites of charging and/or of stabilisation can be done in the polymerisation step to prepare the colorless polymer particles or in a separate step after this polymerisation. It is also possible to functionalise the surface of the particles to provide sites of charging in this polymerisation step and functionalise the surface of the particles to provide sites of stabilisation in a separate step or vice versa.

The selection of the polymerisation conditions depends on the expected size and size distribution of the particles. Adjustment of polymerization conditions is well known to someone skilled in the art.

The most appropriate method to synthesise uniform submicronic particles is by emulsion polymerisation. Emulsion polymerisation is a well known polymerisation process wherein barely water soluble monomers are emulsified in water by an emulsifier and polymerised by water-soluble initiators. Advantageously, the procedure by which an emulsion polymerisation is carried out has a profound effect upon the resulting particle size and polymer properties. Indeed, particles with quite different performance characteristics can be produced from the same reaction formulation by appropriate control of polymerisation process and conditions used. Comprehensive reviews of emulsion polymerisation conditions are given in "Emulsion polymerisation"; van Herk, Alex; Gilbert, Bob; Department of Polymer Chemistry, Eindhoven University of Technology, Eindhoven, Neth. Editor(s): Van Herk.

Preferably, a batch emulsion polymerisation process is used wherein all reactants are completely added at the outset of the polymerisation process. In such process only relatively few variables have to be adjusted for a given formulation. Preferred changes which can be made in such cases are to the reaction temperature, reactor design and the type and speed of stirring. Thus, a batch emulsion polymerisation process is used for manufacture versus a semi-continuous batch process because of limited versatility and simple evaluations of reaction formulation.

To meet the required characteristics of the particles for EPD, a surfactant-free emulsion copolymerisation using a batch process is preferred. Protective colloids (water-soluble polymers) and surfactants are usually key formulation variables in emulsion polymerisation because of their impact on the intraparticle stability and particle size control but they may have a detrimental effect on the electrophoretic response Preferably the polymerisation according to the invention is a free radical polymerisation.

Preferably, a monomer composition according to the invention comprises a structure monomer, a crosslinking monomer, an ionic monomer and an initiator.

The particles can be prepared from most monomer types, in particular methacrylates, acrylates, methacrylamides, acrylonitriles, α-substituted acrylates, styrenes and vinyl ethers, vinyl esters, propenyl ethers, oxetanes and epoxys but would typically be prepared from largest percentage to be monomer, then cross-linker, and include a charged monomer (e.g. quaternised monomer).

Especially preferred are methyl methacrylate and ethylene glycol dimethyl methacrylate as a cross-linker and 2-methacryloxy ethyl trimethyl ammonium chloride (MOTAC) as reactive charged monomer but many others could be used, the following are all examples of which could be used which are commercially available from the Sigma-Aldrich chemical company.

Methacrylates:

Methacrylic acid, Methyl methacrylate (MMA), Ethyl methacrylate (EMA), n-Butyl methacrylate (BMA), 2-Aminoethyl methacrylate hydrochloride, Allyl methacrylate, Benzyl methacrylate, 2-Butoxyethyl methacrylate, 2-(tert-Butylamino)ethyl methacrylate, Butyl methacrylate, tert-Butyl methacrylate, Caprolactone 2-(methacryloyloxy)ethyl ester, 3-Chloro-2-hydroxypropyl methacrylate, Cyclohexyl methacrylate, 2-(Diethylamino)ethyl methacrylate, Di(ethylene glycol) methyl ether methacrylate, 2-(Dimethylamino) ethyl methacrylate, 2-Ethoxyethyl methacrylate, Ethylene glycol dicyclopentenyl ether methacrylate, Ethylene glycol methyl ether methacrylate, Ethylene glycol phenyl ether methacrylate, 2-Ethylhexyl methacrylate, Furfuryl methacrylate, Glycidyl methacrylate, Glycosyloxyethyl methacrylate, Hexyl methacrylate, Hydroxybutyl methacrylate, 2-Hydroxyethyl methacrylate, 2-Hydroxyethyl methacrylate, Hydroxypropyl methacrylate Mixture of hydroxypropyl and hydroxyisopropyl methacrylates, 2-Hydroxypropyl 2-(methacryloyloxy)ethyl phthalate, Isobornyl methacrylate, Isobutyl methacrylate, 2-Isocyanatoethyl methacrylate, Isodecyl methacrylate, Lauryl methacrylate, Methacryloyl chloride, 2-(Methylthio)ethyl methacrylate, mono-2-(Methacryloyloxy)ethyl maleate, mono-2-(Methacryloyloxy)ethyl succinate, Pentabromophenyl methacrylate, Phenyl methacrylate, Phosphoric acid 2-hydroxyethyl methacrylate ester, Stearyl methacrylate, 3-Sulfopropyl methacrylate potassium salt, Tetrahydrofurfuryl methacrylate, 3-(Trichlorosilyl)propyl methacrylate, Tridecyl methacrylate, 3-(Trimethoxysilyl)propyl methacrylate, 3,3,5-Trimethylcyclohexyl methacrylate, Trimethylsilyl methacrylate, Vinyl methacrylate. Preferably Methyl methacrylate (MMA), Ethyl methacrylate (EMA), Methacrylic acid, and/or n-Butyl methacrylate (BMA) are used.

Acrylates:

Acrylic acid, 4-Acryloylmorpholine, [2-(Acryloyloxy)ethyl]trimethylammonium chloride, 2-(4-Benzoyl-3-hydroxyphenoxy)ethyl acrylate, Benzyl 2-propylacrylate, 2-Butoxyethyl acrylate, Butyl acrylate, tert-Butyl acrylate, 2-[(Butylamino)carbonyl]oxy]ethyl acrylate, tert-Butyl 2-bromoacrylate, 4-tert-Butylcyclohexyl acrylate, 2-Carboxyethyl acrylate, 2-Carboxyethyl acrylate oligomers anhydrous, 2-(Diethylamino)ethyl acrylate, i(ethylene glycol) ethyl ether acrylate technical grade, Di(ethylene glycol) 2-ethylhexyl ether acrylate, 2-(Dimethylamino)ethyl acrylate, 3-(Dimethylamino)propyl acrylate, Dipentaerythritol penta-/hexa-acrylate, 2-Ethoxyethyl acrylate, Ethyl acrylate, 2-Ethylacryloyl chloride, Ethyl 2-(bromomethyl)acrylate, Ethyl cis-(β-cyano)acrylate, Ethylene glycol dicyclopentenyl ether acrylate, Ethylene glycol methyl ether acrylate, Ethylene glycol phenyl ether acrylate, Ethyl 2-ethylacrylate, 2-Ethylhexyl acrylate, Ethyl 2-propylacrylate, Ethyl 2-(trimethylsilylmethyl)acrylate, Hexyl acrylate, 4-Hydroxybutyl acrylate, 2-Hydroxyethyl acrylate, 2-Hydroxy-3-phenoxypropyl acrylate, Hydroxypropyl acrylate, Isobornyl acrylate, Isobutyl acrylate, Isodecyl acrylate, Isooctyl acrylate, Lauryl acrylate, Methyl 2-acetamidoacrylate, Methyl acrylate, Methyl α-bromoacrylate, Methyl 2-(bromomethyl)acrylate, Methyl 3-hydroxy-2-methylenebutyrate, Octadecyl acrylate, Pentabromobenzyl acrylate, Pentabromophenyl acrylate, Poly(ethylene glycol) methyl ether acrylate, Poly(propylene glycol) acrylate, Poly(propylene glycol) methyl ether acrylate Soybean oil, epoxidized acrylate, 3-Sulfopropyl acrylate potassium salt, Tetrahydrofurfuryl acrylate, 3-(Trimethoxysilyl)propyl acrylate, 3,5,5-Trimethylhexyl acrylate. Preferably Methyl acrylate, Ethyl acrylate, Acrylic acid, and/or n-Butyl acrylate are used.

Acrylamides:

2-Acrylamidoglycolic acid, 2-Acrylamido-2-methyl-1-propanesulfonic acid, 2-Acrylamido-2-methyl-1-propanesulfonic acid sodium salt solution, (3-Acrylamidopropyl)trimethylammonium chloride solution, 3-Acryloylamino-1-propanol solution purum, N-(Butoxymethyl)acrylamide, N-tert-Butylacrylamide, Diacetone acrylamide, N,N-Dimethylacrylamide, N-[3-(Dimethylamino)propyl]methacrylamide, N-Hydroxyethyl acrylamide, N-(Hydroxymethyl)acrylamide, N-(Isobutoxymethyl)acrylamide, N-Isopropylacrylamide, N-Isopropylmethacrylamide, Methacrylamide, N-Phenylacryiamide, N-[Tris(hydroxymethyl)methyl]acrylamide, Styrenes Styrene, Divinyl benzene, 4-Acetoxystyrene, 4-Benzyloxy-3-methoxystyrene, 2-Bromostyrene, 3-Bromostyrene, 4-Bromostyrene, α-Bromostyrene, 4-tert-Butoxystyrene, 4-tert-Butylstyrene, 4-Chloro-α-methylstyrene, 2-Chlorostyrene, 3-Chlorostyrene, 4-Chlorostyrene, 2,6-Dichlorostyrene, 2,6-Difluorostyrene, 1,3-Diisopropenylbenzene, 3,4-Dimethoxystyrene, α,2-Dimethylstyrene, 2,4-Dimethylstyrene, 2,5-Dimethylstyrene, N,N-Dimethylvinylbenzylamine, 2,4-Diphenyl-4-methyl-1-pentene, 4-Ethoxystyrene, 2-Fluorostyrene, 3-Fluorostyrene, 4-Fluorostyrene, 2-Isopropenylaniline, 3-Isopropenyl-α,α-dimethylbenzyl isocyanate, Methylstyrene, α-Methylstyrene, 3-Methylstyrene, 4-Methylstyrene, 3-Nitrostyrene, 2,3,4,5,6-Pentafluorostyrene, 2-(Trifluoromethyl)styrene, 3-(Trifluoromethyl)styrene, 4-(Trifluoromethyl)styrene, 2,4,6-Trimethylstyrene. Preferably Styrene and/or Divinyl benzene are used.

Vinyl Groups

3-Vinylaniline, 4-Vinylaniline, 4-Vinylanisole, 9-Vinylanthracene, 3-Vinylbenzoic acid, 4-Vinylbenzoic acid, Vinylbenzyl chloride, 4-Vinylbenzyl chloride, (Vinylbenzyl)trimethylammonium chloride, 4-Vinylbiphenyl, 2-Vinylnaphthalene, 2-Vinylnaphthalene, Vinyl acetate, Vinyl benzoate, Vinyl 4-tert-butylbenzoate, Vinyl chloroformate, Vinyl chloroformate, Vinyl cinnamate, Vinyl decanoate, Vinyl neodecanoate, Vinyl neononanoate, Vinyl pivalate, Vinyl propionate, Vinyl stearate, Vinyl trifluoroacetate, Other monomers which may be used are those which have groups to help stabilisation of the particles, e.g. Poly(ethylene glycol) methyl ether acrylate, Poly(ethylene glycol) phenyl ether acrylate, lauryl methacrylate, Poly(ethylene glycol) methyl ether acrylate, Poly(propylene glycol) methyl ether acrylate, Lauryl acrylate and fluorinated monomers of above.

Some of the monomers have groups for further reaction if so desired, e.g. Glycidyl ethacrylate, 2-Hydroxyethyl methacrylate.

The following compounds can be used as intraparticle crosslinking monomers for solubility control and solvent swelling resistance: ethylene glycol dimethacrylate (EGDMA), allyl methacrylate (ALMA), divinyl benzene, Bis[4-(vinyloxy)butyl]adipate, Bis[4-(vinyloxy)butyl]1,6-hexanediylbiscarbamate, Bis[4-(vinyloxy)butyl]isophthalate, Bis[4-(vinyloxy)butyl](methylenedi-4,1-phenylene)biscarbamate, Bis[4-(vinyloxy)butyl]succinate, Bis[4-(vinyloxy)butyl]terephthalate, Bis[4-(vinyloxymethyl)cyclohexylmethyl]glutarate, 1,4-Butanediol divinyl ether, 1,4-Butanediol vinyl ether, Butyl vinyl ether, tert-Butyl vinyl ether, 2-Chloroethyl vinyl ether, 1,4-Cyclohexanedimethanol divinyl ether, 1,4-Cyclohexanedimethanol vinyl ether, Di(ethylene glycol) divinyl ether, Di(ethylene glycol) vinyl ether, Ethylene glycol butyl vinyl ether, Ethylene glycol vinyl ether, Tris[4-(vinyloxy)butyl]trimellitate, 3-(Acryloyloxy)-2-hydroxypropyl methacrylate, Bis[2-(methacryloyloxy)ethyl] phosphate, Bisphenol A propoxylate diacrylate, 1,3-Butanediol diacrylate, 1,4-Butanediol diacrylate, 1,3-Butanediol dimethacrylate, 1,4-Butanediol dimethacrylate, N,N'-(1,2-Dihydroxyethylene)bisacrylamide, Di(trimethylolpropane) tetraacrylate, Diurethane dimethacrylate, N,N'-Ethylenebis(acrylamide), Glycerol 1,3-diglycerolate, Glycerol dimethacrylate, 1,6-Hexanediol diacrylate, 1,6-Hexanediol dimethacrylate, 1,6-Hexanediylbis[oxy(2-hydroxy-3,1-propanediyl)]bisacrylate, Hydroxypivalyl hydroxypivalate bis[6-(acryloyloxy)hexanoate], Neopentyl glycol diacrylate, Pentaerythritol diacrylate, Pentaerythritol tetraacrylate, Pentaerythritol triacrylate, Poly(propylene glycol) diacrylate, Poly(propylene glycol) dimethacrylate, 1,3,5-Triacryloylhexahydro-1,3,5-triazine, Tricyclo[5.2.1.0]decanedimethanol diacrylate, Trimethylolpropane benzoate diacrylate, Trimethyloipropane ethoxylate methyl ether diacrylate, Trimethylolpropane ethoxylate triacrylate, Trimethyloipropane triacrylate, Trimethylolpropane trimethacrylate, Tris[2-(acryloyloxy)ethyl]isocyanurate, Tri(propylene glycol) diacrylate.

Examples of cationic monomers for particle stability and particle size control are 2-methacryloxy ethyl trimethyl ammonium chloride (MOTAC), acryloxy ethyl trimethyl ammonium chloride (AOTAC), [3-(Methacryloylamino)propyl]trimethylammonium chloride, [2-(Methacryloyloxy)ethyl]trimethylammonium methyl sulfate solution, tetraallyl ammonium chloride, diallyl dimethyl ammonium chloride, (Vinylbenzyl)trimethylammoniurn chloride.

Examples of anionic monomers are sodium, potassium or triethylamine salts of methacrylic acid, Acrylic acid, 2-(Trifluoromethyl)acrylic acid, 3-(2-Furyl)acrylic acid, 3-(2-Thienyl)acrylic acid, 3-(Phenylthio)acrylic acid, Poly(acrylic acid) potassium salt, Poly(acrylic acid) sodium salt, Poly(acrylic acid), Poly(acrylic acid, sodium salt) solution, trans-3-(4-Methoxybenzoyl)acrylic acid, 2-Methoxycinnamic acid, 3-Indoleacrylic acid, 3-Methoxycinnamic acid, 4-Imidazoleacrylic acid, 4-Methoxycinnamic acid, Poly(styrene)-block-poly(acrylic acid), Poly(acrylonitrile-co-butadiene-co-acrylic acid), dicarboxy terminated, Poly(acrylonitrile-co-butadiene-co-acrylic acid), dicarboxy terminated, glycidyl methacrylate diester, 2,3-Diphenyl-Acrylic Acid, 2-Me-Acrylic Acid, 3-(1-Naphthyl)Acrylic Acid, 3-(2,3,5,6-Tetramethylbenzoyl)Acrylic Acid, 3-(4-Methoxyphenyl) Acrylic Acid, 3-(4-Pyridyl)Acrylic Acid, 3-p-Tolyl-Acrylic Acid, 5-Norbornene-2-Acrylic Acid, Trans-3-(2,5-Dimethylbenzoyl)Acrylic Acid, Trans-3-(4-Ethoxybenzoyl)Acrylic Acid, Trans-3-(4-Methoxybenzoyl)Acrylic Acid, 2,2'-(1,3-Phenylene)Bis(3-(2-aminophenyl)Acrylic Acid), 2,2'-(1,3-Phenylene)Bis(3-(2-Aminophenyl)Acrylic Acid) hydrochloride, 2,2'-(1,3-Phenylene)Bis(3-(2-Nitrophenyl)Acrylic Acid), 2-[2-(2',4"-Difluoro[1,1]-Biphenyl]-4-Yl)-2-Oxoethyl]Acrylic Acid, 2-(2-(2-Chloroanilino)-2-Oxoethyl)-3-(4-Methoxyphenyl)Acrylic Acid, 2-(2-((2-Hydroxyethyl) Amino)-2-Oxoethyl)-3-(4-Methoxyphenyl)Acrylic Acid, 2-(2-(Cyclohexylamino)-2-Oxoethyl)-3-(4-Methoxyphenyl) Acrylic Acid Preferably, a water soluble initiator is used in the surfactant-free emulsion copolymerisation in order to control size, particle morphology and to reduce the residual monomers at the end of the reaction. Examples are azo compounds or peroxide compounds, hydroperoxides or peracid esters. Preferably azo compounds are used, especially azobis(isobutylamidine) hydrochloride (AIBA) and similar compounds.

The polymerisable composition of the invention usually comprises 50-95%, preferably 70-90° A), by weight of monomer, 1-40%, preferably 1-10% by weight of crosslinking monomer, 1-30%, preferably 1-10° A), by weight of ionic monomer and 0.1-10%, preferably 0.1-5%, by weight of initiator, all percentages are based on the total weight of the polymerisable composition (except solvent).

Cross-linked copolymer particles can be prepared by emulsifier-free copolymerisation of methyl methacrylate (MMA), ethylene glycol dimethacrylate (EGDMA), and a cationic comonomer, methacryloxy ethyl trimethyl ammonium chloride (MOTAC) using azobis(isobutylamidine) hydrochloride (AIBA) as an initiator. Preferably, emulsifier-free emulsion polymerisations are conducted using a batch process.

Polymer particles prepared according to the invention are preferably spherical particles with a size (diameter) in the range of 50-1000 nm and preferably with a monodisperse size distribution. Preferred particle sizes are 50-600 nm, preferably 50-560 nm, especially 50-500 nm, even more preferred 100-400 nm. Especially preferred are particles having a particle size of 150-400 nm, especially of 150-350 nm. Particle sizes are determined by photon correlation spectroscopy of aqueous particle dispersions by a common apparatus such as a Malvern NanoZS particle analyser.

The size of polymer particles in electrophoretic fluids may be different from sizes measured in aqueous dispersions because of the influence of solvents and/or surfactants. In electrophoretic fluids, the polymer particles of the invention preferably have a particle size of 100-800 nm, especially 100-700 nm, preferably 150-700 nm are preferred. Especially preferred are polymer particles having a particle size of 150-600 nm.

It is possible to color the polymer particles in the vessel as a direct follow-on from the first step to prepare the particles—hence enabling a cost effective production route.

Colouration of polymer particles can be done by several dyeing technologies such as disperse dyeing or "solvent swelling of particles". The "solvent swelling of particles" technology is preferred because it is a lower temperature process. Cross-linked organic polymeric particles are prepared and then are swelled by addition of a water miscible organic solvent together with a polymerisable dye, optionally co-monomers, optionally an initiator. After stirring at a warm temperature, the dye becomes associated with the softened particle due to an entropic dilution effect. Use of a surfactant can be helpful. The polymerisable dye is then homo- or copolymerised. Monomers described in the foregoing for preparation of the polymeric particles can be combined with the polymerisable dyes. Particularly preferable are monomers which are similar to the particle make up. Preferably an oil-soluble thermal initiator is used.

The organic solvent is removed and the dye is left associated with the particle. The particles are washed and dried. After drying, the particles are dispersed in typical EPD fluids and no dye leaching is observed.

The amounts in which the dyes are mixed with the polymeric nanoparticles can vary within wide limits depending on their solubility in the solvent and the desired depth of shade; in general, amounts from 1 to 30% by weight, preferably 1.5-10% by weight, based on the material to be colored, have proved to be advantageous. Preferred solvents that may be used are water miscible, for example butanone, dioxane, or acetone. Also a mixture that is made up of 80-95% by volume of one or more of these solvents and an alkyl alcohol of 3-5 carbon atoms can be used. Especially, butanone can advantageously be used. Advantageously, the dyeing process can be run without the addition of emulsifiers. Preferably the dyeing process is conducted in a temperature range of from room temperature to 100 C.°, especially preferred in a range from 50 C.° to 90 C.°, especially 75-90 C.°. The dyeing process is preferably carried out by mixing the polymer particles and the dye in a solvent and stirring the mixture at a predetermined temperature for 0.5-4 hours, preferably 1-3 hours. A preferred stirring speed of 30-300 rpm may be used. For water miscible solvents like acetone the stirring speed is preferably 30-50 rpm, for water non-miscible solvent it is 50-200 rpm. The polymerisable dye is homo- or copolymerised, preferably at the temperature of the dying step. Preferably an initiator is added. The solvent supernatant can then be removed after centrifugation and replaced with water in the cleaning process. The particles are dried by common techniques, preferably by freeze drying. This process gives dyed nanoparticles without altering their initial size and morphology.

Particles of the invention are primarily designed for use in electrophoretic displays. A typical electrophoretic display preferably consists of the particles dispersed in a low polar or non-polar solvent along with additives to improve electrophoretic properties, such as stability and charge. Examples of such dispersions are well described in the literature, for example U.S. Pat. No. 7,247,379; WO 99/10767; US 2007/0128352; U.S. Pat. No. 7,236,290; U.S. Pat. No. 7,170,670; U.S. Pat. No. 7,038,655; U.S. Pat. No. 7,277,218; U.S. Pat. No. 7,226,550; U.S. Pat. No. 7,110,162; U.S. Pat. No. 6,956,690; U.S. Pat. No. 7,052,766; U.S. Pat. No. 6,194,488; U.S. Pat. No. 5,783,614; U.S. Pat. No. 5,403,518; U.S. Pat. No. 5,380,362.

Typical additives to improve the stability of the fluid (either by steric stabilisation or by use as a charging agent) are known to experts in the field and include (but are not limited to) the Brij, Span and Tween series of surfactants (Sigma-Aldrich), the Solsperse, Ircosperse and Colorburst series (Lubrizol Ltd.), the OLOA charging agents (Chevron Chemicals) and Aerosol-OT (Sigma-Aldrich).

Any other additives to improve the electrophoretic properties can be incorporated provided they are soluble in the formulation medium, in particular thickening agents or polymer additives designed to minimise settling effects.

The dispersion solvent can be chosen primarily on the basis of dielectric constant, refractive index, density and viscosity. A preferred solvent choice would display a low dielectric constant (<10, more preferably <5), high volume resistivity (about $10^{15}$ ohm-cm), a low viscosity (less than 5 cst), low water solubility, a high boiling point (>80° C.) and a refractive index and density similar to that of the particles. Tweaking these variables can be useful in order to change the behaviour of the final application. For example, in a slow-switching application such as poster displays or shelf labels, it can be advantageous to have an increased viscosity to improve the lifetime of the image, at the cost of slower switching speeds. However in an application requiring fast switching, for example e-books and displays, a lower viscosity will enable faster switching, at the cost of the lifetime in which the image remains stable (and hence an increase in power consumption as the display will need more frequent addressing). The preferred solvents are often non-polar hydrocarbon solvents such as the Isopar series (Exxon-Mobil), Norpar, Shell-Sol (Shell), Sol-Trol (Shell), naphtha, and other petroleum solvents, as well as long chain alkanes such as dodecane, tetradecane, decane and nonane). These tend to be low dielectric, low viscosity, and low density solvents. A density matched particle/solvent mixture will yield much improved settling/sedimentation characteristics and thus is desirable. For this reason, often it can be useful to add a halogenated solvent to enable density matching. Typical examples of such solvents are the Halocarbon oil series (Halocarbon products), or tetrachlorethylene, carbon tetrachloride, 1,2,4-trichlorobenzene and similar solvents. The negative aspect of many of these solvents is toxicity and environmental friendliness, and so in some cases it can also be beneficial to add additives to enhance stability to sedimentation rather than using such solvents.

The preferred additives and solvents used in the formulation of the particles of the invention are OLOA11000 (Chevron Chemicals), Ircosperse 2153 (Lubrizol Ltd), and dodecane (Sigma Aldrich)

Usually electrophoretic fluids comprise a charged inorganic particle such as titania, alumina or barium sulphate, coated with a surface layer to promote good dispersibility in dielectric media and a dielectric fluid media. The solvents and additives used to disperse the particles are not limited to those used within the examples of this invention and many other solvents and/or dispersants can be used. Lists of suitable solvents and dispersants for electrophoretic displays can be found in existing literature, in particular WO 99/10767) and WO 2005/017046) The electrophoretic fluid is then incorporated into an electrophoretic display element by a variety of pixel architectures, such as can be found in C. M. Lampert, Displays; 2004, 25(5) published by Elsevier B.V., Amsterdam.

Electrophoretic displays comprise typically, the electrophoretic display media in close combination with a monolithic or patterned backplane electrode structure, suitable for switching the pixels or patterned elements between the black and white optical states or their intermediate greyscale states.

The electrophoretic particles according to the present invention are suitable for all known electrophoretic media and electrophoretic displays, e.g. flexible displays, one particle systems, two particle systems, dyed fluids, systems comprising microcapsules, microcap systems, air gap systems and others as described in C. M. Lampert, Displays; 2004, 25(5) published by Elsevier B.V., Amsterdam. Examples of flexible displays are dynamic keypads, e-paper watches, dynamic pricing and advertising, e-readers, rollable displays, smart card media, product packaging, mobile phones, lab tops, display card, digital signage.

Apart from the preferred compounds mentioned in the description, the use thereof, compositions and processes, the claims disclose further preferred combinations of the subject-matters according to the invention.

The disclosures in the cited references are thus expressly also part of the disclosure content of the present application.

The following examples explain the present invention in greater detail without restricting the scope of protection. In particular, the features, properties and advantages, described in the examples, of the compounds on which the relevant examples are based can also be applied to other substances and compounds which are not described in detail, but fall within the scope of protection, unless stated otherwise elsewhere. In addition, the invention can be carried out throughout the range claimed and is not restricted to the examples mentioned here.

EXAMPLES

The characterisation of the formulations was performed using a Malvern NanoZS particle analyser. This instrument measures the size of particles in dispersion and the zeta potential of an electrophoretic fluid. The Zeta potential (ZP) is derived from the real-time measurement of the electrophoretic mobility and thus is an indicator of the suitability of the fluid for use in electrophoretic applications.

Example 1

Preparation of Polymethyl Methacrylate (PMMA) Nanoparticles

Methyl methacrylate (95.0 g), ethylene glycol dimethacrylate (8.0 g) and [2-(methacryloyloxy)ethyl]-trimethyl ammonium chloride solution (75% in water) (4.1 g) are stirred at 300 rpm under an atmosphere of nitrogen in a 2 liter 3-neck flask. The mixture is heated up to 70° C. and when this temperature is reached 2,2'-azobis(2-methylpropionamidine) dihydrochloride (1.0 g) is added. After 20 hours the resultant white latex is allowed to cool to room temperature, and is filtered through a 5 micron cloth. The latex has a solid content of 10.3% and the overall yield is 90%. Analysis using a Malvern Zetasizer shows a highly monodisperse latex (1) with a particle size of 197 nm.

A second set of PMMA particles (2) is prepared which after freeze drying give a particle size of 147 nm, as measured in water on a Malvern zetasizer.

Example 2

Polymethyl Methacrylate (PMMA) Particles
Incorporating Disperse Red 1 Methacrylate.
(Comparative Example to Show that
Non-Polymerised Dye does Leach from Particle)

Disperse Red 1 methacrylate (Sigma-Aldrich) (30 mg) is dissolved in acetone (20 ml) in a 50 ml round bottom flask. PMMA latex (2) (15.0 g, 10.9% solid content) and a drop of surfactant Igepal CO-720 are added and stirred. The mixture is heated at 48° C. for 2 hours. The acetone is removed under vacuum by rotary evaporation. The dyed latex is allowed to cool to room temperature and is filtered through a 5 micron filter cloth to remove any dye aggregates. The filtrate is centrifuged (10000 rpm×25 min.) and the supernatant is removed and discarded and replaced with water, this process is repeated three times. The suspension is redispersed in water and is analysed using a Malvern Zetasizer. This shows a highly disperse latex with a particle size of 188 nm+/−2.2 nm and a polydispersity index of 0.002. Zeta potential gives a measurement of +39.7 mV+/−1.3 mV. The water is removed from the latex by freeze drying to give a fine red powder (0.9 g).

The following method is used to determine whether dye is leaching from particles:

A known quantity of the freeze dried particles is weighed into a fixed volume of dodecane and redispersed. The dispersion is centrifuged for 5 minutes at 1000 rpm. The supernatant is removed, filtered through a 0.1 micron PTFE (polytetrafluoroethylene) syringe filter. The remaining particles are added to a further fixed volume of dodecane. The above experimental is repeated as many times as required to determine whether dye is leaching from the particles.

The supernatant appears a red color and is still colored after 3 washes. This shows that dye is leaching into dodecane.

in addition the supernatants are analysed by ultra-violet/visible spectrophometric analysis over a suitable range (typically 350-700 nm) to determine if dye leaching is occurring.

Example 3

Polymethyl Methacrylate (PMMA) Particles Dyed with Disperse Red 1 Methacrylate Copolymerised with Methyl Methacrylate Disperse red 1 methacrylate (30 mg) is dissolved in butanone (10 ml) in a 50 ml 3-neck round bottom flask. Dried PMMA particles (1) (1.5 g), water (10 ml), methyl methacrylate (0.10 ml) and surfactant NP12 (1 drop) are added and stirred. The mixture is degassed and purged with nitrogen. The mixture is heated at 80° C. for 2 hours to swell the particle and allow incorporation of the monomers. Vazo 67 (2,2'-Azobis(2-methylbutyronitrile), 8 mg) is added and the reaction is stirred over night at 80° C. The mixture is allowed to cool to room temperature and is filtered through a 50 micron filter cloth. The crude mixture is centrifuged (10000 rpm×25 min.), the solvent supernatant is removed and discarded and replaced with water until it is colorless (3×). The suspension is redispersed and is freeze dried to give a red powder. Analysis using a Malvern Zetasizer shows a particle size of 687 nm. The method described for Example 2 is used to determine whether dye is leaching from particles. No dye leaching is detected.

Example 4

Preparation of Methacrylate Ester Derivative of Cl Basic Blue 41

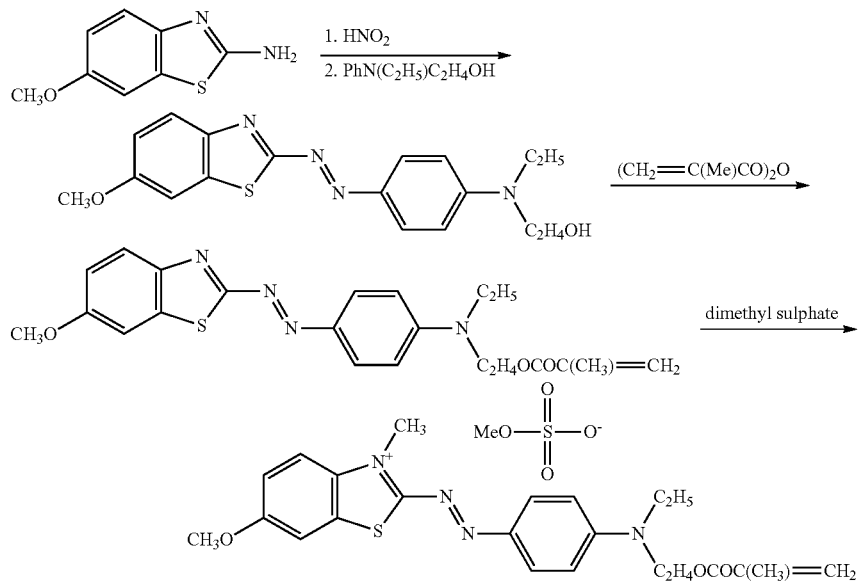

Stage 1

2-Amino-6-methoxybenzothiazole (18.0 g) is stirred in a mixture of acetic acid (70 ml) and propionic acid (50 ml) at 50° C. The resulting solution is cooled to −10° C. Nitrosyl-sulphuric acid solution (40 weight-% in sulphuric acid) (32.0 g) is added dropwise. This mixture is added to a stirred solution of N-ethyl-N-(2-hydroxyethyl) aniline and sulphamic acid (1.0 g) in acetic acid (25 ml) and ice/water (100 ml). After 20 minutes, the pH is raised to 4 by the dropwise addition of potassium hydroxide solution. A tarry residue is formed; the mixture is stirred for a further 2 hours until the tar solidifies. This solid is collected, washed with water and then dissolved in alcohol and acetone to give a deep red solution. Hot water is added to precipitate a solid which is removed by filtration. The solid is washed with cold alcohol and dried (29.5 g, 83% yield) Mp 178-179° C.

Stage 2

The above hydroxyethyl disperse dye (10.7 g) dye is stirred in methylene chloride (100 ml) and pyridine (20 ml). Methacrylic anhydride (10 ml) is added and the mixture is heated under reflux for 24 hours. On cooling to room temperature, water (5 ml) is added and the mixture is stirred for 2 hours. A volatile material is removed under reduced pressure, to leave a tarry residue which is stirred in 5 weight-% aqueous sodium bicarbonate solution for 16 hours. The resulting crude product is dissolved in methylene chloride/hexane (60/40) and passed through silica gel. After removal of solvent the solid residue (9.7 g) is crystallised from propan-2-ol to yield a rubine crystalline solid.

Yield 7.0 g, 55%. mp 123125° C.

Stage 3

Dimethyl sulphate (1 ml) is added dropwise to a stirred solution of the methacrylate ester (1.06 g) in toluene (25 ml) at 100° C. After 10 minutes a tar begins to deposit on the walls of the flask and the mixture is allowed to cool to room temperature. The tar is washed with cold toluene and is stirred overnight in ethyl acetate (25 ml). The resulting semi-solid residue is collected, added to propan-2-ol and the mixture is heated to boiling. On cooling a solid is deposited which is washed with cold propan-2-ol and dried.

Yield 1.22 g, 89%. Mp 140-142° C. (97.3% main component by hplc) C23H27N4OS gives a mass ion of 439.

A mass spectrum of the sample gave a spectrum in positive ion mode. (EI+)

The spectra show ions at m/z 439 which corresponds with the cation for the proposed structure.

Example 5

Polymethyl Methacrylate (PMMA) Particles Dyed with Methyl Methacrylate of Basic Blue 41 (No. 1 in Table 2) Copolymerized with Methyl Methacrylate Basic blue 41 methacrylate (dye from example 4) (30 mg) is dissolved in butanone (10 ml) in a 50 ml 3-neck round bottom flask. Dried PMMA particles (1) (1.5 g), water (10 ml), methyl methacrylate (0.10 ml) and surfactant Igepal CO-720 (Sigma-Aldrich) (1 drop) are added and stirred. The mixture is degassed and purged with nitrogen. The mixture is heated at 80° C. for 2 hours to swell the particle and allow incorporation of the monomers. Vazo 67 (2,2'-Azobis(2-methylbutyronitrile), 8 mg) is added and the reaction is stirred over night at 80° C. The mixture is allowed to cool to room temperature and is filtered through a 50 micron filter cloth. The crude mixture is centrifuged (10000 rpm×25 min.), the solvent supernatant is removed and discarded and replaced with water until it is colorless (3×). The suspension is redispersed and is freeze dried to give a blue powder. Analysis using a Malvern Zetasizer shows a highly disperse latex with a particle size of 253 nm with a zeta potential of +25 mV. The method described for Example 2 is used to determine whether dye is leaching from particles. No dye leaching is detected.

Example 6

Polymethyl Methacrylate (PMMA) Particles Dyed with Disperse Yellow 7 Methacrylate Copolymerized with Methyl Methacrylate Disperse yellow 7 methacrylate (Sigma-Aldrich) (30 mg) is dissolved in butanone (10 ml) in a 50 ml 3-neck round bottom flask. Dried PMMA particles (1) (1.5 g), water (10 ml), methyl methacrylate (0.1 ml) and surfactant Igepal CO-720 (Sigma-Aldrich) (1 drop) are added and stirred. The mixture is degassed and purged with nitrogen to remove oxygen. The mixture is heated at 80° C. for 2 hours to swell the particle and allow incorporation of the monomers. Vazo 67 (2,2'-Azobis(2-methylbutyronitrile), 8 mg) is added and the reaction is stirred over night at 80° C. Polymerisation progress is monitored by TLC using 1:1 dichloromethane: petroleum 60-80° C. as eluant. The mixture is allowed to cool to room temperature and is filtered through a 50 micron filter cloth to remove any dye aggregates. The crude mixture is centrifuged (10000 rpm×25 min.), the solvent supernatant is removed and discarded and replaced with water until it is colorless (3×). The suspension is redispersed and is freeze dried to give a yellow powder. Analysis using a Malvern Zetasizer shows a latex with a particle size of 387 nm with a zeta potential of +35 mV.

The method described for Example 2 is used to determine whether dye is leaching from particles. No dye leaching is detected.

Example 7

Polymethyl Methacrylate (PMMA) Particles Dyed with Disperse Red 1 Acrylate Copolymerized with Methyl Methacrylate Disperse red 1 acrylate (Sigma-Aldrich) (30 mg) is dissolved in butanone (10 ml) in a 50 ml 3-neck round bottom flask. Dried PMMA particles (1) (1.5 g), water (10 ml), methyl methacrylate (0.1 ml) and surfactant Igepal CO-720 (Sigma-Aldrich) (1 drop) are added and stirred. The mixture is degassed and purged with nitrogen to remove oxygen. The mixture is heated at 80° C. for 2 hours to swell the particle and allow incorporation of the dye. Vazo 67 (2,2'-Azobis(2-methylbutyronitrile), 8 mg) is added and the reaction is stirred over night at 80° C. The mixture was allowed to cool to room temperature and is filtered through a 50 micron filter cloth to remove any dye aggregates. The crude mixture is centrifuged (10000 rpm×25 min.), the solvent supernatant is removed and discarded and replaced with water until it is colorless (3×). The suspension is redispersed and is freeze dried to give a red powder. Analysis using a Malvern Zetasizer shows a latex with a particle size of 402 nm with a zeta potential of +38 mV. The method described for Example 2 is used to determine whether dye is leaching from particles. No dye leaching is detected.

Example 8

Comparison

Electrophoretic Formulation Containing PMMA Incorporating Disperse Red 1 Methacrylate 0.1242 g of colored PMMA latex of Example 2 is added to 0.0133 g of OLOA 11000 in 1.8692 g of dodecane and vortex mixed. The resultant dispersion is then homogenised using an IKA Ultra-turrax T25 homogeniser for 15 mins and Sonicated for a further 15 minutes in an Ultrawave ultrasonic bath. The dispersion is then roller mixed overnight, decanted and filtered thru 1 micron cloth to yield a red electrophoretic ink.

Size (280 nm), Electrophoretic Mobility (0.02658 μmcm/Vs), ZP (+22.2 mV).

Example 9

Electrophoretic Formulation Containing PMMA Particles Dyed with Disperse Red 1 Methacrylate Copolymerised with Methyl Methacrylate 0.0351 g of colored PMMA latex of Example 3 is added to 0.0039 g of OLOA 11000 in 0.5005 g of dodecane and vortex mixed. The resultant dispersion is then homogenised using an ultra-turrax T25 homogeniser for 15 minutes and Sonicated for a further 15 minutes in an Ultrawave ultrasonic bath. The dispersion is then roller mixed overnight, decanted and filtered thru 1 micron cloth to yield a red electrophoretic ink. Size (456 nm), Electrophoretic Mobility (0.03082 μmcm/Vs), ZP (+28.3 mV).

Example 10

Electrophoretic Formulation Containing PMMA Particles Dyed with Methacrylate of Basic Blue 41 Copolymerised with Methyl Methacrylate 0.022 g of colored PMMA latex of Example 4 is added to 0.0032 g of OLOA 11000 in 0.3081 g of dodecane and vortex mixed. The resultant dispersion is then homogenised using an ultra-turrax T25 homogeniser for 15 minutes and Sonicated for a further 15 minutes in an Ultrawave ultrasonic bath. The dispersion is then roller mixed overnight, decanted and filtered thru 1 micron cloth to yield a blue electrophoretic ink.
Size (320 nm), Electrophoretic Mobility (0.02996 μmcm/Vs), ZP (+29.4 mV).

The invention claimed is:

1. A process for the preparation of colored polymer particles for use in electrophoretic devices, comprising the steps of:
   a) preparing polymer particles,
   b) coloring the polymer particles by addition of at least one polymerizable dye,
   c) polymerizing the polymerizable dye, and optionally
   d) washing and drying the colored polymer particles,
   wherein the polymerizable dye is Disperse Red 1 methacrylate or acrylate, Disperse Yellow 7 methacrylate or acrylate, a dye of formula 1, a dye of Formula 2 or a dye of formula 3:

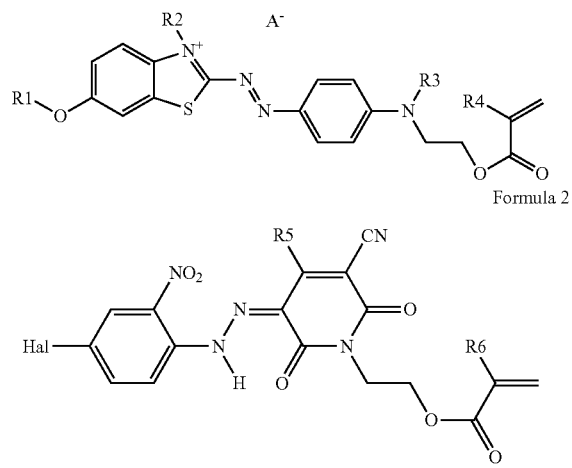

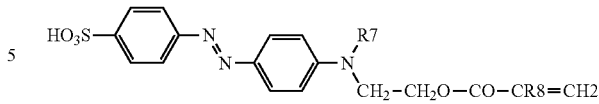

wherein R1,R2,R3,R5 and R7=alkyl,
R4, R6 and R8=H or $CH_3$,
Hal=halogen,
$A^-$=a halogen or monobasic acid (oxo) anion.

2. The process according to claim 1, wherein the polymerizable dye is homo-polymerized.

3. The process according to claim 1, wherein the polymerizable dye is co-polymerised with additional monomers.

4. The process according to claim 1, wherein an oil-soluble thermal initiator and/or a surfactant is added in step c).

5. The process according to claim 1, wherein the polymer particles of step a) are prepared from a composition comprising a monomer, a crosslinker, an ionic monomer, and an initiator by surfactant-free emulsion copolymerisation in a batch process.

6. The process according to claim 1, wherein the coloring of the polymer particles in step b) is done by solvent swelling with at least one polymerizable dye at a temperature range from 50-90° C.

7. The process according to claim 1, wherein the colored polymer particles have a diameter of 50-1000 nm.

8. Colored polymer particles comprising a polymeric framework and at least one polymerized dye prepared by the process of claim 1.

9. A mono, bi or polychromal electrophoretic device comprising colored polymer particles according to claim 8.

10. An electrophoretic fluid comprising colored polymer particles according to claim 8.

11. An electrophoretic display device comprising colored polymer particles according to claim 8.

12. A process according to claim 1, wherein the polymer particles prepared in step a) comprise sites of charging and/or of stabilization.

13. A process according to claim 1, wherein the polymerizable dye is a dye of formula 1 which is a methacrylate or acrylate ester derivative of CI Basic Blue 41, a dye of Formula 2 wherein Hal=Cl and R5 and R6=$CH_3$, or a dye of formula 3 wherein R7=$C_2H_5$ and R8=$CH_3$.

14. A process according to claim 1, wherein, in the formulae:
R1,R2,R3,R5, R7=$C_1$-$C_4$ alkyl, and
$A^-$=acetate, propionate, lactate, methane sulphonate, p-toluenesulphonate, hydroxide or nitrate anion.

15. The process according to claim 1, wherein the colored polymer particles have a diameter of 150-600 nm.

* * * * *